(12) United States Patent
Collins (10) Patent No.: US 7,067,056 B2
(45) Date of Patent: Jun. 27, 2006

(54) WATER FILTER WITH INTEGRATED TREATMENT MEDIA

(75) Inventor: Jeffrey W. Collins, Chatsworth, CA (US)

(73) Assignee: Thornbury Investments, Inc., Valencia, CA (US)

( * ) Notice: Subject to any disclaimer, the term of this patent is extended or adjusted under 35 U.S.C. 154(b) by 104 days.

(21) Appl. No.: 10/854,468

(22) Filed: May 27, 2004

(65) Prior Publication Data

US 2005/0263445 A1    Dec. 1, 2005

(51) Int. Cl.
*B01D 29/15* (2006.01)
*C02F 1/50* (2006.01)

(52) U.S. Cl. ............... 210/167; 210/169; 210/206; 210/416.1; 210/416.2; 210/493.1; 210/501; 210/506

(58) Field of Classification Search ........... 210/167, 210/169, 198.1, 206, 209, 416.1, 416.2, 437, 210/493.1, 501, 493.2, 503, 504, 506, 749, 210/764; 422/275–277
See application file for complete search history.

(56) References Cited

U.S. PATENT DOCUMENTS

| | | | | |
|---|---|---|---|---|
| 3,772,193 A * | 11/1973 | Nelli et al. | ................ | 210/756 |
| 5,089,127 A * | 2/1992 | Junker et al. | ............... | 210/206 |
| 5,976,364 A * | 11/1999 | Williams | .................... | 210/136 |
| 6,004,458 A * | 12/1999 | Davidson | ................... | 210/206 |
| 6,066,253 A | 5/2000 | Idland et al. | | |
| 6,254,788 B1 * | 7/2001 | Davidson | ................... | 210/764 |
| 6,283,308 B1 * | 9/2001 | Patil et al. | ................. | 210/484 |
| 6,447,677 B1 * | 9/2002 | King | ...................... | 210/198.1 |
| 2002/0043493 A1* | 4/2002 | Patil | .......................... | 210/266 |
| 2004/0055939 A1* | 3/2004 | Wybo | ......................... | 210/169 |
| 2004/0168962 A1* | 9/2004 | Mattson et al. | ............ | 210/169 |

* cited by examiner

*Primary Examiner*—Fred G. Prince
(74) *Attorney, Agent, or Firm*—William W. Haefliger (57) ABSTRACT

For use in a pool or spa, the combination comprising, filter structure in the path of pool or spa water flow, substance in direct contact with a surface or surfaces of said filter structure, to contact said flow, said substance characterized as being one of the following:
  i) bacteria inhibiting
  ii) an algaecide
  iii) an algaestat
  iv) a sanitizer
  v) a bacteriostat

12 Claims, 8 Drawing Sheets

WATER FILTER WITH INTEGRATED TREATMENT MEDIA

BACKGROUND OF THE INVENTION

The invention concerns use of an active biological algaecide, algaestat, bacteriostat or sanitizer in the embodiment of a filter, for example, a filter designed primarily for use in pool and spa applications, however, it's application extends to any body of water in which active control of sanitizers or bacteria/algae control is desired.

The construction of the filter utilizes materials and or natural elements that are either designed to or naturally contain chemicals, materials or natural properties that are employed or actively engage in either sanitizing, oxidizing, aid in sanitizing and oxidizing, inhibit the growth or formation of algae or bacteria or prevent the growth or formation of algae or bacteria.

The invention uses said materials either within its main construction, or as part of the screening material of the embodiment itself.

Currently, pool and spa filters are manufactured out of a media of some sort and a structure designed solely to support the filter media, afford attachment to the unit, and to allow water to flow freely through the filter.

Algaecides and algaestats are used in the pool and spa industry to aid sanitizers in the growth inhibition, killing and curtailing of future growth of algae. These chemicals, compounds and elements are manufactured and constructed into shapes allowing maximum surface area. These pieces are then placed into vessels to provide treatment packages that are inserted into a filter or filter housing, allowing the water to flow through the vessels and contact the materials while flowing through the filter.

Definitions of Treatment Materials:

Algae: A single-celled plant. Of the thousand of varieties, the most common in spas and pools are: blue-green, yellow mustard or black. Algae commonly known as "Pink" algae is actually a bacteria and is usually present as a slime. Algae can transpose itself over very broad areas or in individual spots or areas. A condition with a low sanitizer level is conducive for algae growth.

Algaecide: A chemical that kills algae. They are commonly available in a variety of chemical types: quaternary ammonium compounds, copper, silver or polymer (poly quat). Chlorine and bromine function as algaecides. Different types show varying effects against different strains of algae (i.e. some are better than others at killing certain strains of algae).

Algaestat: A chemical or element that inhibits or retards algae growth, however, it does not necessarily kill the algae. Zinc is a common example of an algaestat.

Such treatment packages are not part of the filter or system itself. In such situations the material status and usefulness cannot easily be monitored or replaced. Additionally, replacement of the material or unit requires extensive and cumbersome procedures.

SUMMARY OF THE INVENTION

The present invention allows the treatment materials to be manufactured into the filter or sanitizing media embodiment itself, allowing both monitoring when the filter or equipment is serviced, and/or replacement when the filter or other such equipment is replaced, as scheduled and required. As will be seen, when the water flows around or through the material, the properties of the material are either added to the composition of the water, or the act of contacting the water allows the material being utilized to chemically affect the water as it comes into contact with the material itself. In this regard, extensive distribution and effect of the treating material is made possible by its extensive use on filter surfaces, as opposed to a single spot use of treatment material, in a local added package. There are situations where water flow through or by the material is beneficial, as well as situations where just the presence of said materials in the body of water will afford the desired chemical or sanitizing results. In either case, including the material in the embodiment of the filter or filter housing itself satisfies both circumstances.

Accordingly, invention utilizes the materials, mainly algaecides and algaestats, as materials of construction for the filter itself. No longer will the filter and algaecide/algaestat be used as separate pieces. The chemicals and compounds that are the algaecide and algaestat are the materials used to construct the filter structure itself. This will afford the support of the filter media, afford attachment to the unit as well as allowing water to flow freely through the filter, all the while accomplishing the desired contact of the flowing water with the algaecide or algaestat.

An additional benefit of utilizing the algaestat zinc is the fact that zinc will act as a sacrificial anode in the water, thus helping to prevent the corrosion of any metal parts in the pool or spa. This is similar to the concept of using a zinc bar in a hot water heater—the corrosion occurs to the zinc bar, not the hot water heater.

The central support of the filter, referred to as the center core is the component most likely to be manufactured out of an algaecide or algaestat. Other configurations include, but are not limited to utilizing strands or threads of algaecide or algaestat in the construction of the media itself, or building an inner or outer screen out of the algaecide or algaestat.

Accordingly, it is a major object of the invention to provide, for use in a pool or spa, or other body of water, a combination that includes:

a) filter structure in the path of pool or spa water flow, b) substance on a surface or surfaces of said filter structure, to contact said flow, c) said substance characterized as being one of the following:
  i) bacteria inhibiting
  ii) an algaecide
  iii) an algaestat
  iv) a sanitizer
  v) bacteriostat As will be seen, the substance typically has the form of a coating on said filter structure surface or surfaces or as the material of manufacture of the filter internals. The filter unit or structure typically includes a pleated filter element or wall facing element, on which said substance is coated; or the filter structure typically includes a perforate tube in the filter structure interior to receive and pass filtered water, and on which said substance is coated, or the substance may be widely spaced on many filter surfaces exposed to water flow, or processed into the filter structure, as produced.

Another object includes provision of the water treating substance plated or adhered to one or more of such elements, or the element itself may be at least partly formed by that substance, which is typically metallic, consisting of one or more of the following:
  i) tin
  ii) copper
  iii) zinc iv) silver
v) silver plated on copper
vi) oxides of the above.

As the filter unit is replaced, the water treating substance is automatically replaced, and need not be separated from the filter or separately inserted into the replacement filter; saving time and energy, as well as avoiding the problem of inadvertent non-placement of water treating substance into the filter.

These and other objects and advantages of the invention, as well as the details of an illustrative embodiment, will be more understood from the following specification and drawings, in which:

DETAILED DESCRIPTION

The present invention is particularly applicable to a filter unit or structure 18, as seen in FIGS. 1–9.

Figure 1:
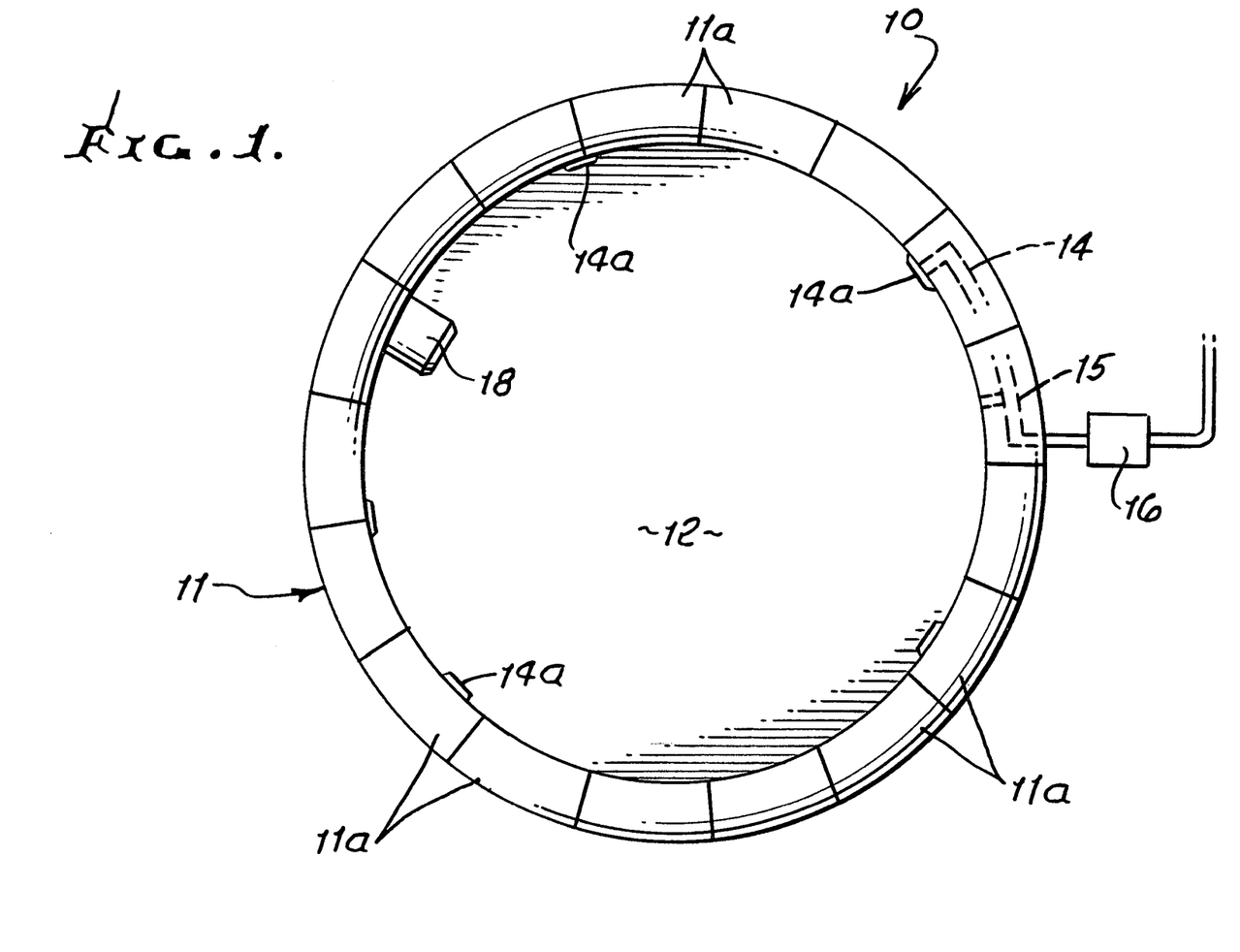
FIG. 1 is a plan view of a spa or pool apparatus into which the filter unit is integrated.
Figure 2:
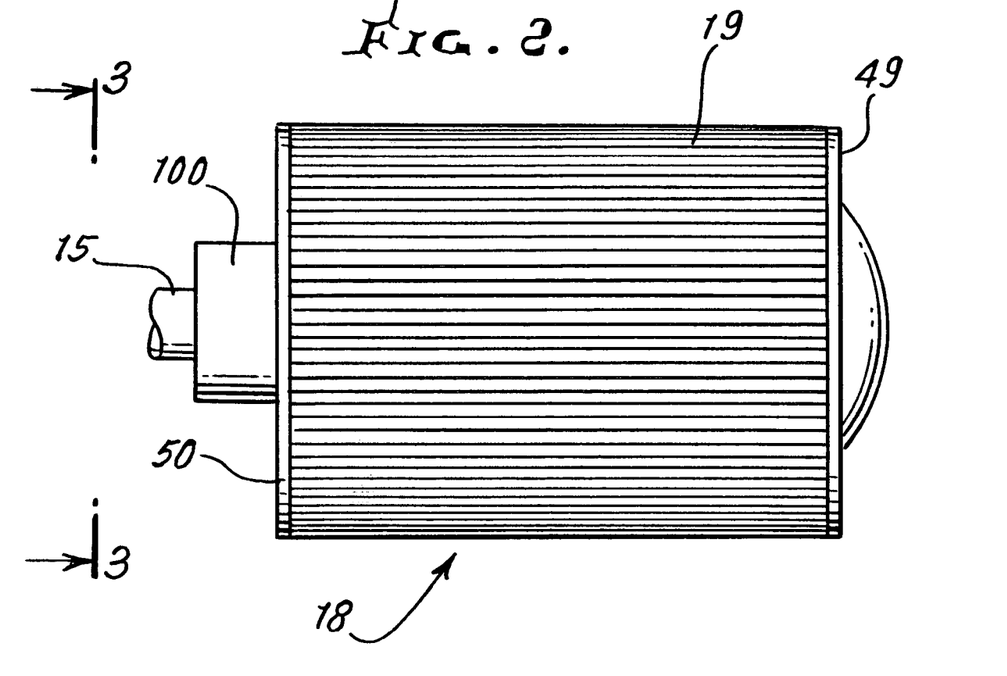
FIG. 2 is an enlarged elevational view of one filter unit.
Figure 3:
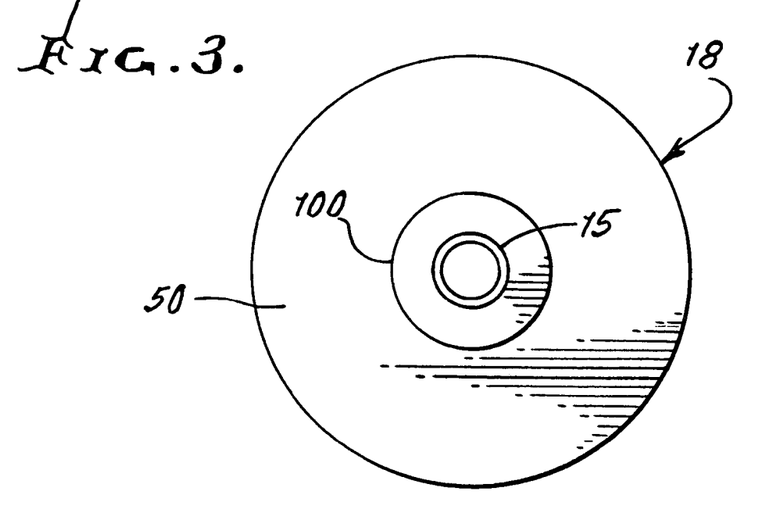
FIG. 3 is an end view taken on lines 3—3 of FIG. 2.

In FIG. 1, a pool or spa unit 10 includes an annular upright side wall 11 and a bottom wall 12. The side wall may consist of multiple sections 11*a*. The self-supporting side wall may consist of plastic material, as disclosed for example in U.S. Pat. Nos. 5,745,934 and 5,749,107. The side wall is shown to contain upper ducting 14 to supply water under pressure to jets at 14*a* that supply water to the interior of unit 10. Lower ducting 15 receives water from the body of contained water in the pool or spa, as under suction exerted by a pump indicated at 16. The pump re-supplies water to ducting 14, under pressure.

Figure 4:
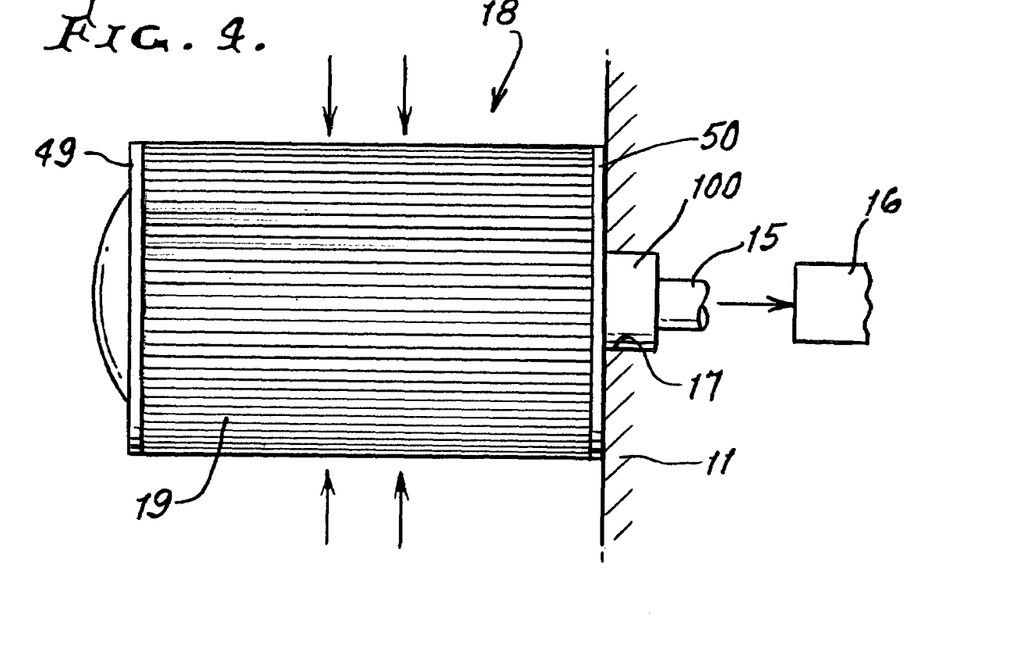
FIGS. 4 and 4*a* are side views showing two modes of water flow into and out of the filter unit.
Figure 4A:
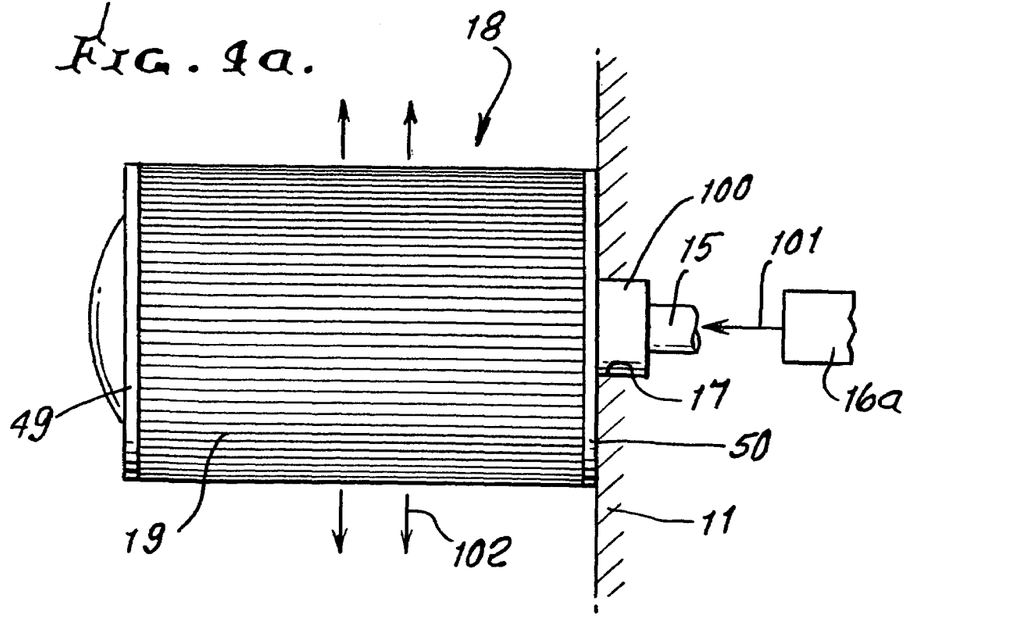

As seen in FIG. 4, suction is exerted via a side opening 17 in side wall 11 to the interior of a filter unit 18, for flowing pool or spa water through the cylindrical, porous filter element 19 of unit 18, via side opening 17 to duct 15. Unit 18 is easily replaceable, or connectible to wall 11, as via sleeve 100. FIG. 4*a* shows the pump 16*a* displacing water at 101 into the filter unit 18 via the connector 100, to flow into the pool at 102.

Figure 5:
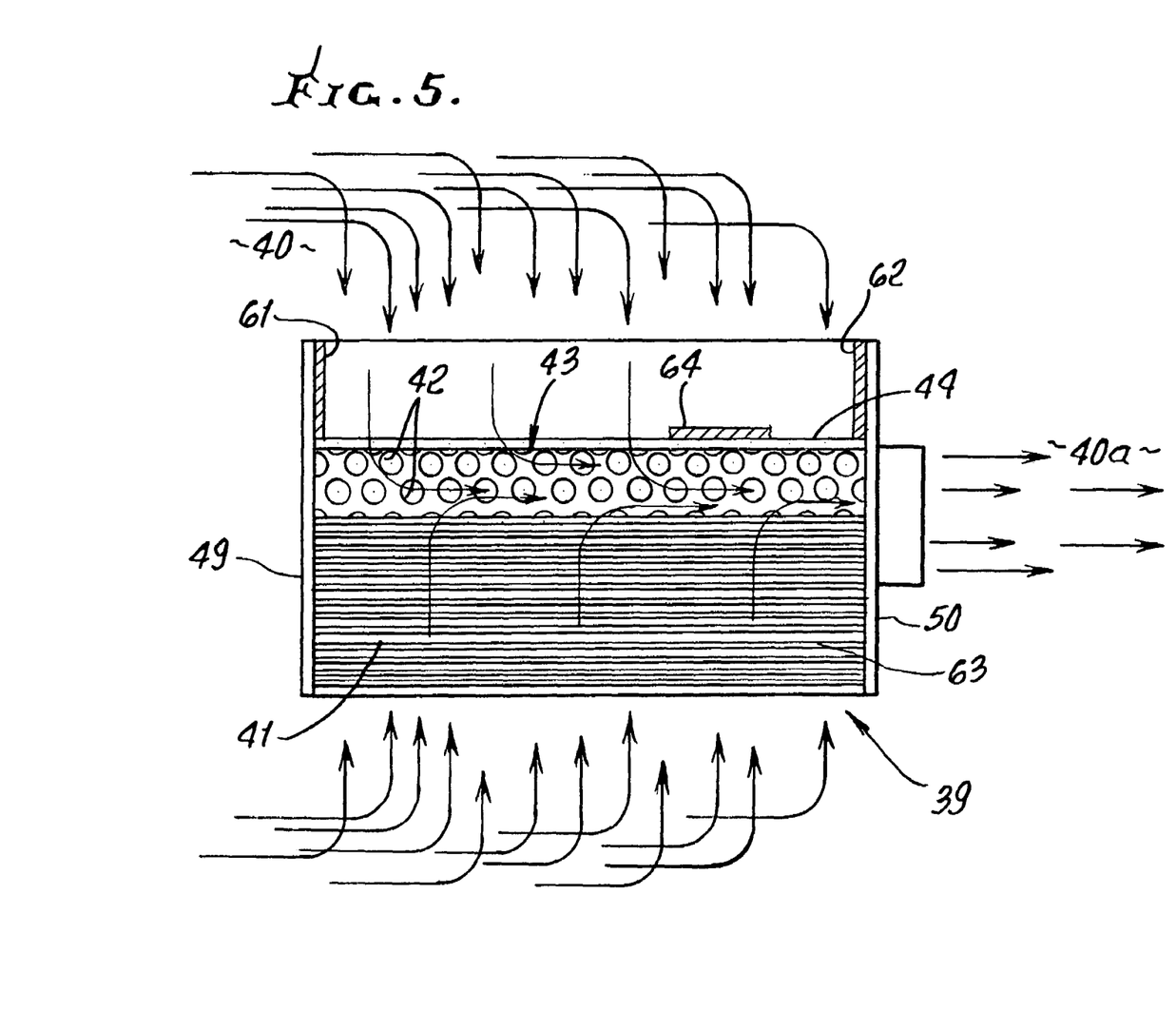
FIG. 5 is a schematic view of water flow into and out of a filter unit.

FIG. 5 shows a filter unit 39 in which water flow 40 enters sidewardly the filter unit, and exits endwise at 40*a*. Such flow passes through filter media pleats 41 and then through opening 42 in internal tube 43. The water then flows endwise in tube 43 to exit at 40*a*. Water treating material may extend over, for example be coated on, all or part of the tube, walls 44, end caps 49 and 50, and pleats, for controlled exposure to pool or spa water, to control water treatment. See coatings 61 and 62 on end walls or caps 49 and 50, coatings 63 on pleats, and coating 64 on the tube. Water flows axially and radially, and turbulently adjacent extended surfaces of the material.

The coating typically consists of one or more of the following:
i) bacterial inhibiting
ii) an algaecide
iii) an algaestat
iv) a sanitizer
v) a bacteriostat Examples of i) are: Iodine, chlorine, bromine, copper, silver and several polymers
Examples of ii) are: copper, silver, polyquats and quats
Examples of iii) are: silver, copper and several polymers
Examples of iv) are: chlorine, bromine, biguanides and iodine
Examples of v) are: benzyl alcohol, chloramines B, chloramines T and several polymer Other examples are bacteriostats and algaestats utilized in the medical and plastics industries, as for heart valves, replacement bone parts and items easily contaminated in public areas such as handles, knobs and other commonly touched devices.

Figure 10:
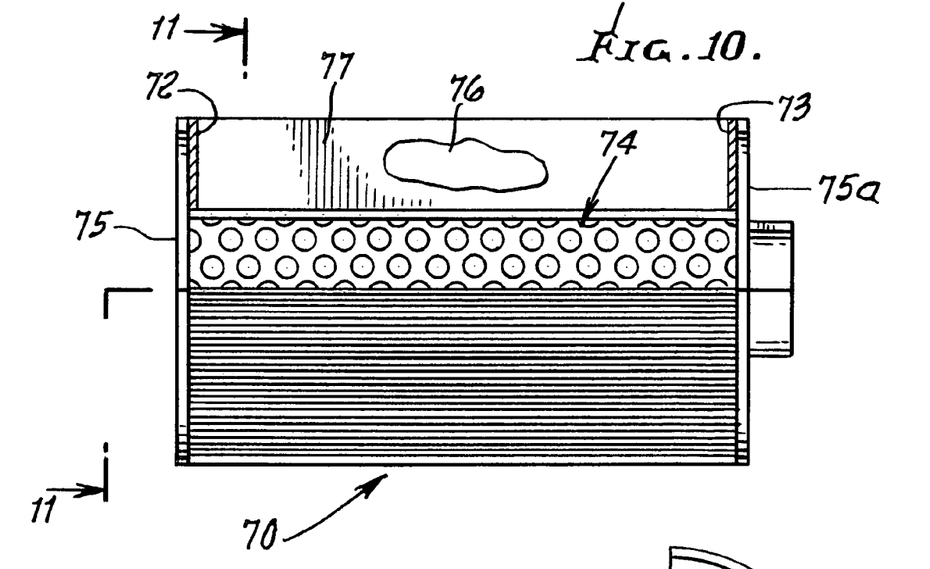
FIG. 10 is a schematic side view of a modified filter incorporating the invention.
Figure 11:
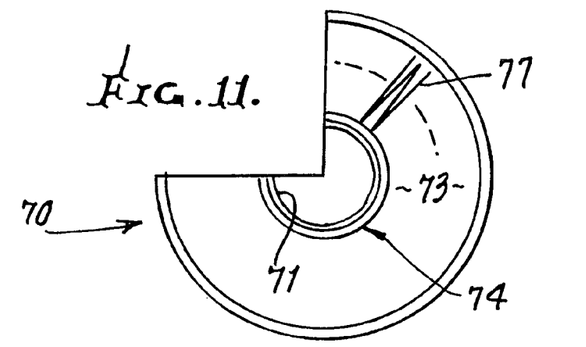
FIG. 11 is an end view taken on lines 11—11 of FIG. 10.
Figure 12:
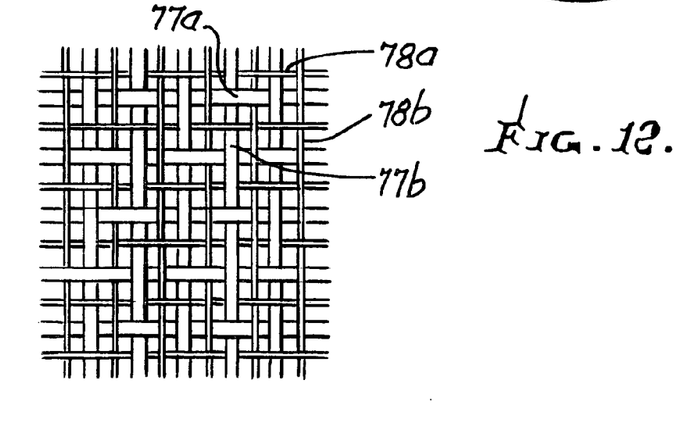
FIG. 12 is a schematic enlarged plan view of a texture water treating filter media incorporating the invention.

See also the generalized filter unit or structure 70 in FIGS. 10–12, with the water treating substance extensively coated at 71–73 on the perforated tube 74, (or tube 74 manufactured out of such substance) and/or the end walls 75 and 75*a*, and/or at 76 on the filter media pleats 77. Such pleats spaced about the tube between walls 75 and 75*a* may have a textured open weave (to pass water) woven construction, as shown in FIG. 12, with warp and woof strands 77*a* and 77*b* consisting of thin ribbons of the water treating substance (as for example metal), and strands 78*a* and 78*b* consisting of other material (plastic for example). It is understood that the water treating material may extend over all or part of the tube, walls and pleats, with controlled exposure to pool or spa water, by filter position (for example), thereby to control water treatment.

Figure 13:
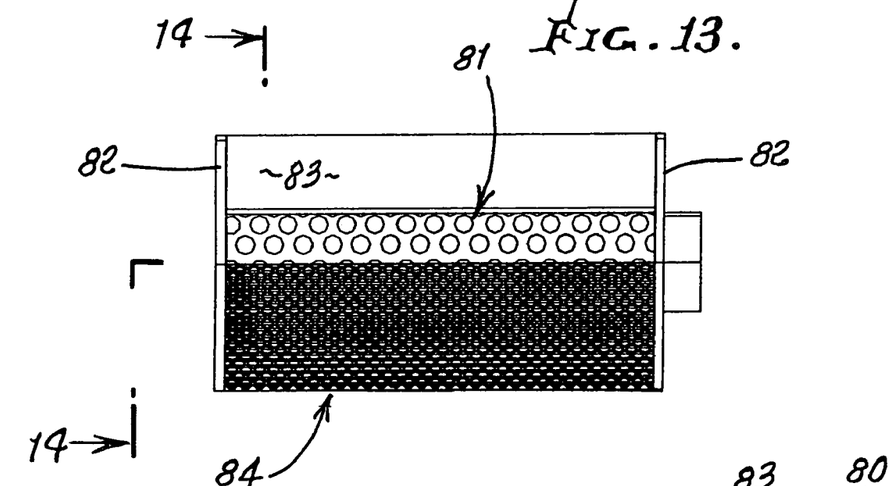
FIG. 13 is a view like FIG. 10 showing a modification.
Figure 14:
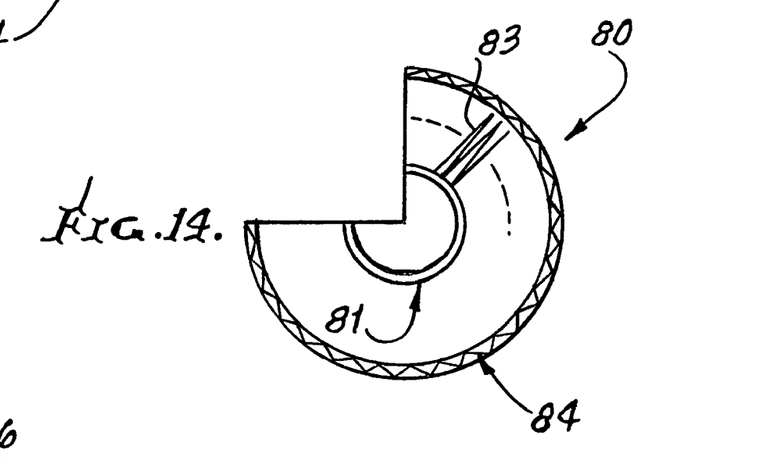
FIG. 14 is an end view taken on lines 14—14 of FIG. 13.
Figure 15:
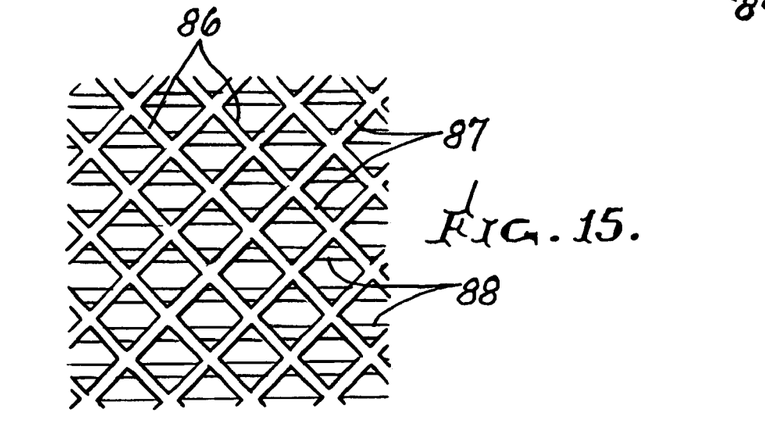
FIG. 15 is a schematic enlarged view of external textured, water treating structure on the FIG. 13 filter.

The modified generalized filter unit or structure 80 in FIGS. 13–15 incorporates perforated tube 81, end walls 82, and filter media pleats 83, as in FIGS. 10 and 11, for maximum contact with water flow through the filter. A perforate wall such as a cage 84 extends about the pleats and may have a textured configuration as shown in FIG. 15, with open weave water passing configuration. The cage consists of parallel strands 86 intersecting parallel strands or ribbons 87 of water treating substance, such as metallic ribbons, and support strands 88 of other material such as plastic.

In the above, the water treating bactericide or algaecide, may consist essentially of one or more of the following materials:
i) tin
ii) copper
iii) zinc
iv) silver
v) silver plated on copper
vi) oxides of i), ii), iii), iv), and v).

The treating substance may be layered or coated onto the filter structure, or may be integral with the filter structure.

Figure 6:
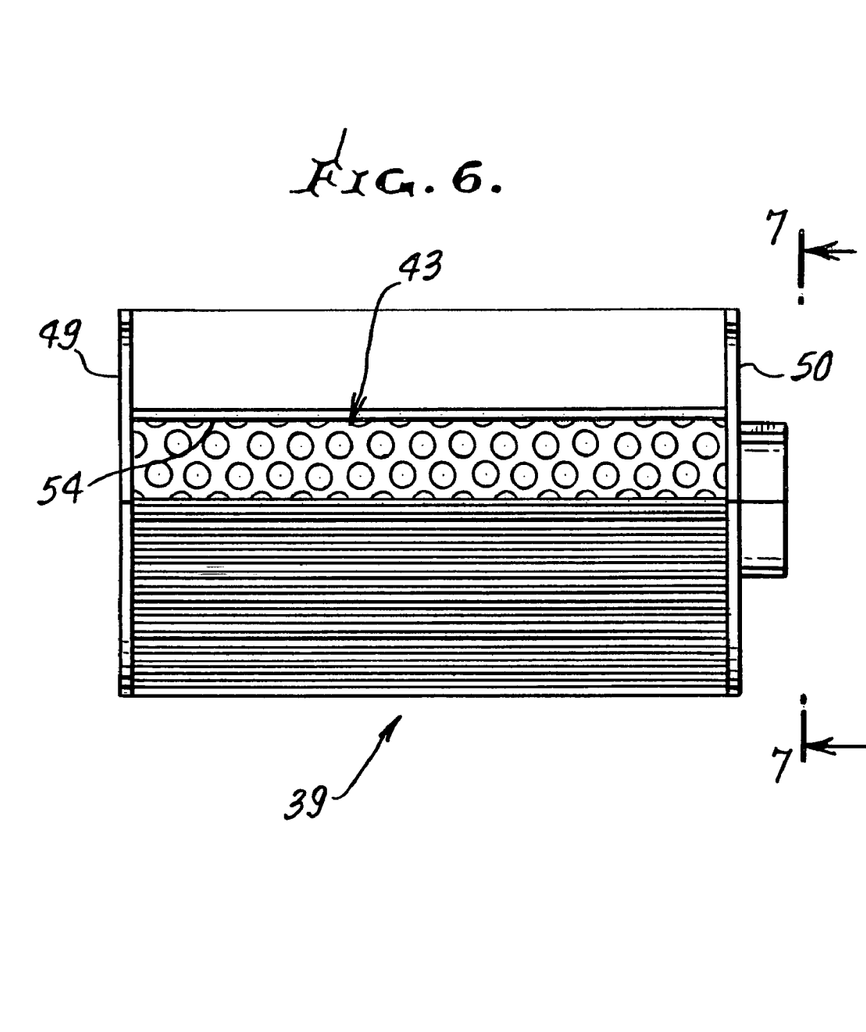
FIG. 6 is an enlarged elevation, taken in cut-away section, through a filter unit, showing a center section.
Figure 7:
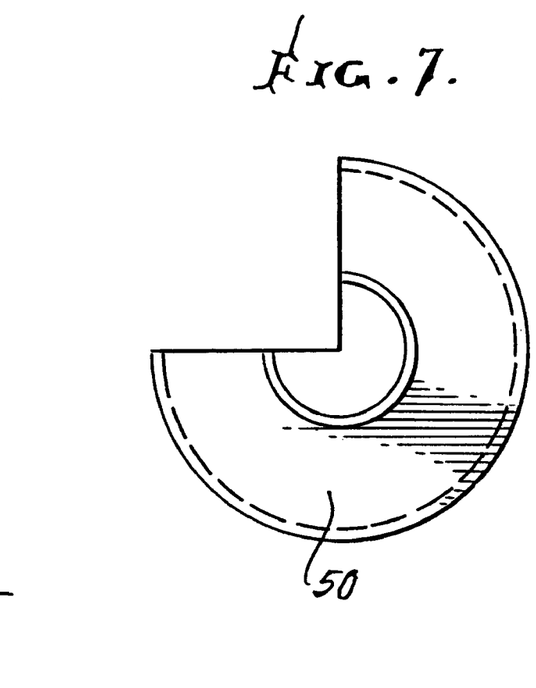
FIG. 7 is an endwise axial view taken on line 7—7 of FIG. 6.

FIGS. 6 and 7 show a filter unit as at 39 in FIG. 5, wherein the center section, such as tube 43, is itself constructed or manufactured of a sanitizing, algaecide, algaestat, bacteria inhibiting material, indicated at 54.

Figure 8:
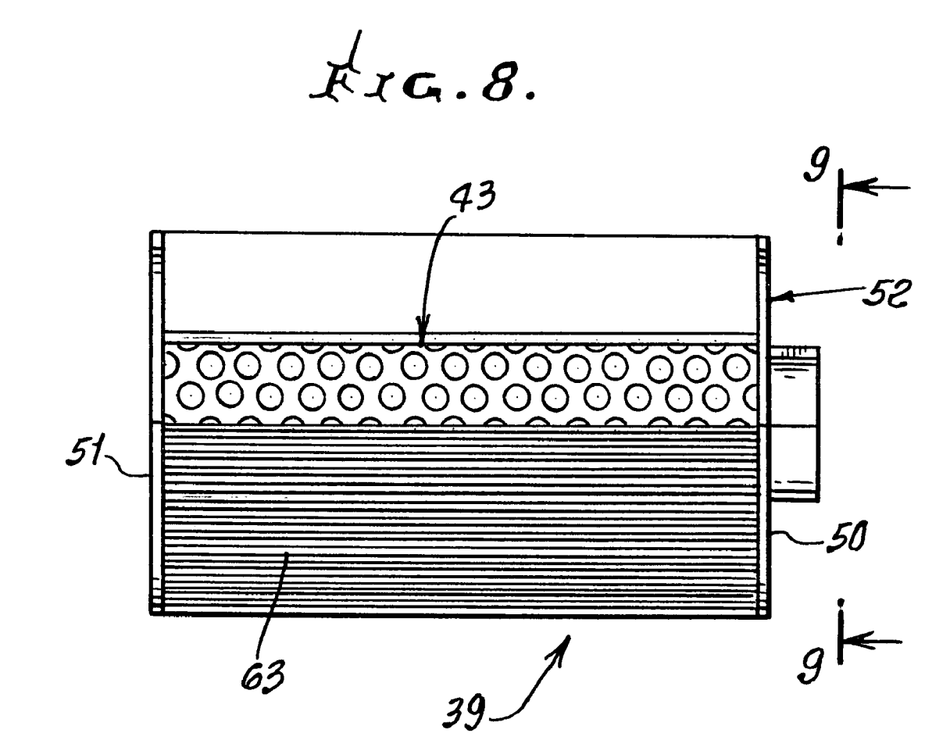
FIG. 8 is a cut-away elevation similar to FIG. 6.
Figure 9:
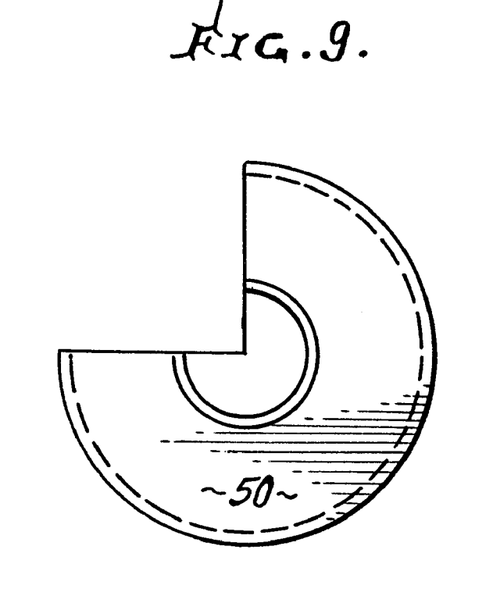
FIG. 9 is an endwise axial view taken on lines 9—9 of FIG. 8.

FIGS. 8 and 9 show a filter unit, as at 39 in FIG. 5 wherein end caps 50 and 51 are themselves constructed or manufactured of a combination sanitizing, algaecide, algaestat, bacteria inhibiting material, indicated at 52.

As respects FIGS. 1–15, the invention also provides, in combination:

a) a tub having a sidewall to extend about a water receiving zone, b) and a filter unit in said zone and having connection to support structure at the tub sidewall, such that the treating substance or coating, or manufactured element, is spaced from the tub sidewall and is exposed to water flow proximate the tub side wall, enabling ready removal and replacement with the filter unit.

Accordingly, the inventive combination of elements, for use in a pool or spa, includes the use of a filter structure having a cover plate in flow passing registration with said perforate tube, said substance coated on said cover plate, in endwise facing alignment with filter element pleats also extending endwise; whereby said substance is also outside the filter but contacts some of said flow.

I claim:

1. A combination for use in a pool or spa, comprising:
   a) filter structure in the path of pool or spa water flow, said structure having pleats
   b) substance in direct contact with or integral with a surface or surfaces of said filter structure, to contact said flow,
   c) said substance characterized as being one of the following:
      i) bacteria inhibiting
      ii) an algaecide
      iii) an algaestat
      iv) a sanitizer
      v) a bacteriostat
   d) said substance having the form of a coating on said filter structure surface or surfaces,
   e) said filter structure including
      $x_1$)a perforate tube in the filter structure interior to receive and pass filtered water,
      $x_2$) a pleated filter element extending about said tube, said substance coated on both said tube and filter element,
   f) said filter structure having a cover plate in flow passing registration with said perforate tube, said substance coated on said cover plate, in endwise facing alignment with filter element pleats also extending endwise; whereby said substance is also outside the filter but contacts some of said flow.

2. The combination of claim 1 including a pool or spa side wall having a water passing opening therein, said filter structure carried by said side wall in water flow passing communication with said side wall opening.

3. The combination of claim 1 wherein said tube defines said surface or surfaces which is or are metallic.

4. The combination of claim 3 wherein said metallic surface or surfaces includes at least one of the following:
   i) tin
   ii) copper
   iii) zinc
   iv) silver
   v) silver plated on copper
   vi) oxides of one or more of i), ii), iii), iv) and v).

5. The combination of claim 1 wherein said substance has a textured configuration to pass water, and forms part of the filter structure.

6. The combination of claim 1 including a pool or spa sidewall to which a body carrying said filter structure is releasably attached, enabling quick replacement of the body and filter structure carrying said substance.

7. The combination of claim 6 wherein said substance is spaced from said sidewall.

8. The combination of claim 6 wherein said filter structure has an axis, directed toward said sidewall, whereby water flow passes turbulently adjacent extended surfaces of said substance.

9. The combination of claim 1 including
   d) a tub having a sidewall to extend about a water receiving zone,
   e) said filter structure located in said zone and having connection to support structure at said side wall such that said substance is spaced from said sidewall and exposed to water flow proximate said sidewall.

10. The method of claim 1 including means for adjusting the elevation of said filter structure relative to the water level in a pool or spa, to thereby adjust the exposure of said substance to said flow, for controlling water treatment by said substance.

11. The method of claim 1 including a perforate cage extending about filter pleats, said substance carried by said cage.

12. The combination of claim 1 including a pool or spa sidewall to which a body carrying said filter structure is releasably attached, enabling quick replacement of the body and filter structure carrying said substance, and wherein said substance is everywhere spaced from said sidewall.

* * * * *